(12) United States Patent
Hasegawa et al.

(10) Patent No.: US 10,175,519 B2
(45) Date of Patent: Jan. 8, 2019

(54) MIRROR DISPLAY HAVING TOUCH PANEL

(71) Applicant: Sharp Kabushiki Kaisha, Osaka (JP)

(72) Inventors: Masahiro Hasegawa, Osaka (JP); Hiroyuki Hakoi, Osaka (JP); Akira Sakai, Osaka (JP); Kiyoshi Minoura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/507,914

(22) PCT Filed: Aug. 26, 2015

(86) PCT No.: PCT/JP2015/073929
§ 371 (c)(1),
(2) Date: Mar. 1, 2017

(87) PCT Pub. No.: WO2016/035624
PCT Pub. Date: Mar. 10, 2016

(65) Prior Publication Data
US 2017/0285382 A1    Oct. 5, 2017

(30) Foreign Application Priority Data
Sep. 2, 2014 (JP) .................. 2014-178361

(51) Int. Cl.
*G06F 3/038* (2013.01)
*G02F 1/1333* (2006.01)
(Continued)

(52) U.S. Cl.
CPC .......... *G02F 1/13338* (2013.01); *A47G 1/02* (2013.01); *G02F 1/133536* (2013.01);
(Continued)

(58) Field of Classification Search
USPC ................. 345/173, 174, 205; 430/301; 359/485.02, 485.04, 485.07, 443; 349/96,
(Continued)

(56) References Cited

U.S. PATENT DOCUMENTS 4,816,378 A * 3/1989 Powers ............ G03F 3/107
                                              430/301
6,108,059 A * 8/2000 Yang ............... G02B 6/0056
                                              349/117
(Continued)

FOREIGN PATENT DOCUMENTS

JP        2004-212717 A        7/2004
JP        2011-523668 A        8/2011
(Continued)

*Primary Examiner* — Thuy Pardo
(74) *Attorney, Agent, or Firm* — ScienBiziP, P.C.

(57) ABSTRACT

One aspect of the present invention provides a touch panel-equipped mirror display that can reduce distortion and ghosting in mirror images while also reducing the rainbow effect in displayed images. The touch panel-equipped mirror display according to one aspect of the present invention includes, in order from a rear side: a display device that includes a polarizer; a touch panel; and a mirror plate that includes a reflective polarizer and a substrate, wherein the reflective polarizer and the substrate are fixed together, and wherein the touch panel does not create a phase difference in light. It is preferable that the substrate be a glass substrate with a thickness of greater than or equal to 0.1 mm and less than or equal to 0.4 mm.

6 Claims, 4 Drawing Sheets

(51) Int. Cl.
*G06F 3/045* (2006.01)
*A47G 1/02* (2006.01)
*G02F 1/1335* (2006.01)

(52) U.S. Cl.
CPC .. *G06F 3/045* (2013.01); *G02F 2001/133302* (2013.01); *G02F 2202/28* (2013.01); *G02F 2203/02* (2013.01)

(58) Field of Classification Search
USPC .......................................................... 349/117
See application file for complete search history.

(56) References Cited

U.S. PATENT DOCUMENTS

| | | | | |
|---|---|---|---|---|
| 2005/0105176 | A1* | 5/2005 | Lippey | H04N 9/3114 359/443 |
| 2007/0183037 | A1* | 8/2007 | De Boer | A47G 1/02 359/485.02 |
| 2008/0151372 | A1* | 6/2008 | Ouderkirk | B32B 33/00 359/485.04 |
| 2008/0285128 | A1* | 11/2008 | Nieuwkerk | A47G 1/02 359/485.07 |
| 2011/0038045 | A1 | 2/2011 | Zhou et al. | |
| 2014/0132897 | A1* | 5/2014 | Oya | G02B 5/305 349/96 |
| 2016/0026039 | A1 | 1/2016 | Sakai et al. | |

FOREIGN PATENT DOCUMENTS

| | | |
|---|---|---|
| JP | 2014-157289 A | 8/2014 |
| WO | 2014/112525 A1 | 7/2014 |

\* cited by examiner

MIRROR DISPLAY HAVING TOUCH PANEL

TECHNICAL FIELD

The present invention relates to a touch panel-equipped mirror display. More particularly, the present invention relates to a touch panel-equipped mirror display that includes a touch panel as well as a mirror display that can function both as a display for displaying images and as a mirror.

BACKGROUND ART

In recent years, mirror displays in which a mirror plate is arranged on the front surface of a display device so that the display device can also function as a mirror have been developed for use in applications such as digital signage. Mirror displays can display images using the display light emitted from the display device and can also function as mirrors by reflecting external light. Here, well-known examples of optical members that exhibit this reflective functionality include deposited metal films, dielectric multilayer films, multilayer reflective polarizers, wire grid polarizers, reflective polarizers in which cholesteric liquid crystals are used in combination with a quarter-wave plate, and the like.

Furthermore, configurations that include such a mirror display in combination with a touch panel (touch panel-equipped mirror displays) have also been developed (see Patent Document 1, for example). There are several well-known touch panel technologies that utilize various methods of sensing touch, including resistive touch panels, capacitive touch panels, and electromagnetic induction touch panels, for example.

RELATED ART DOCUMENT

Patent Document

Patent Document 1: Japanese Patent Application Laid-Open Publication No. 2004-212717

SUMMARY OF THE INVENTION

Problems to be Solved by the Invention

However, in some touch panel-equipped mirror display configurations, the reflected image produced by the mirror (hereinafter, simply the "mirror image") is prone to distortion.

FIG. 6 is a cross-sectional view schematically illustrating a first touch panel-equipped mirror display that was studied by the present inventors. As illustrated in FIG. 6, this touch panel-equipped mirror display 201a includes a liquid crystal display device 202, an air gap 203a, a touch panel 204, and a reflective polarizer 211 that are arranged in that order from the rear side to the viewing side. The air gap 203a is a space formed by a small gap between the liquid crystal display device 202 and the touch panel 204.

The liquid crystal display device 202 includes a backlight 206 and a liquid crystal panel 207 that are arranged in that order from the rear side to the viewing side. The liquid crystal panel 207 includes an absorptive polarizer 208a, a liquid crystal cell 209, and an absorptive polarizer 208b that are arranged in that order from the rear side to the viewing side. The liquid crystal cell 209 includes a liquid crystal layer sandwiched between a pair of substrates (not illustrated in the figure).

The touch panel 204 is a resistive touch panel that includes a transparent resistive member 210a and a transparent resistive member 210b arranged in that order from the rear side to the viewing side. The transparent resistive member 210a includes a transparent conductive film formed on the surface of a substrate, and the transparent resistive member 210b includes a transparent conductive film formed on the surface of another film. The transparent resistive members 210a and 210b are arranged such that the transparent conductive films thereof face one another. The reflective polarizer 211 is fixed to the transparent resistive member 210b on the side opposite to the transparent resistive member 210a.

Upon studying the mirror images (reflected images) produced by the touch panel-equipped mirror display 201a when illuminated with fluorescent light, the present inventors found that distortion was present in those mirror images. After investigating the cause of this distortion in the mirror images, the present inventors discovered that the reflective polarizer 211 was warped. The present inventors therefore proceeded to investigate the cause of this warping in the reflective polarizer 211 and discovered that because the transparent resistive member 210b to which the reflective polarizer 211 is fixed is made of a soft film that is prone to warping (has a low flatness), the reflective polarizer 211 directly inherits any warping present in the transparent resistive member 210b.

Similarly, the invention disclosed in Patent Document 1 describes a configuration in which two film-shaped members are used as a pair of transparent resistive members for a touch panel and a transflective layer (such as a reflective polarizer) is arranged on the surface of one of those members. However, because the film-shaped transparent resistive members are prone to warping, the transflective layer is also prone to warping, which in turn causes the abovementioned distortion in the mirror images to occur.

The present inventors therefore proceeded to focus on configurations such as that illustrated in FIG. 7, in which a reflective polarizer 211 is fixed to the rear side of a touch panel 204 (that is, to the side of a transparent resistive member 210a that is opposite to a transparent resistive member 210b). FIG. 7 is a cross-sectional view schematically illustrating a second touch panel-equipped mirror display that was studied by the present inventors. As illustrated in FIG. 7, this touch panel-equipped mirror display 201b is the same as the touch panel-equipped mirror display 201a except in that the reflective polarizer 211 is fixed to the side of the transparent resistive member 210a that is opposite to the transparent resistive member 210b, and therefore a redundant description will be omitted here.

Upon studying the mirror images produced by the touch panel-equipped mirror display 201b when illuminated with fluorescent light, the present inventors found that the distortion in the mirror images was reduced. This is because here the transparent resistive member 210a to which the reflective polarizer 211 is fixed includes a substrate that is not prone to warping (has a high flatness), and therefore the reflective polarizer 211 is also less prone to warping. However, the present inventors also found that the mirror images exhibited a ghosting effect. Upon investigating the cause of this ghosting effect in the mirror images, the present inventors found that light that entered the touch panel-equipped mirror display 201b from the viewing side was primarily reflected by both the transparent resistive member 210b and the reflective polarizer 211, and therefore both reflected images were visible.

The present inventors therefore proceeded to focus on configurations such as that illustrated in FIG. 8, in which a mirror plate 205 that includes a reflective polarizer 211 and a substrate 212 that are fixed together is arranged on the viewing side of a touch panel 204. FIG. 8 is a cross-sectional view schematically illustrating a third touch panel-equipped mirror display that was studied by the present inventors. As illustrated in FIG. 8, this touch panel-equipped mirror display 201c is the same as the touch panel-equipped mirror display 201a except in that the mirror plate 205 is arranged on the viewing side of the touch panel 204, and therefore a redundant description will be omitted here. Here, the touch panel-equipped mirror display 201c includes a liquid crystal display device 202, an air gap 203a, the touch panel 204, an air gap 203b, and the mirror plate 205, which are arranged in that order from the rear side to the viewing side. The air gap 203b is a space formed by a small gap between the touch panel 204 and the mirror plate 205.

The mirror plate 205 includes the reflective polarizer 211 and the substrate 212, which are arranged in that order from the rear side to the viewing side. The reflective polarizer 211 and the substrate 212 are fixed to one another.

Upon studying the mirror images produced by the touch panel-equipped mirror display 201c when illuminated with fluorescent light, the present inventors found that both distortion and ghosting in the mirror images were reduced. Here, the reason for the reduction in the ghosting effect in the mirror images is because light that enters the touch panel-equipped mirror display 201c from the viewing side is primarily reflected by the reflective polarizer 211, and the effects of reflection by the transparent resistive member 210b are relatively minor in comparison to in the touch panel-equipped mirror display 201b. The present inventors therefore predicted that this configuration could make it possible to provide a touch panel-equipped mirror display that reduces both distortion and ghosting in the mirror images.

However, upon studying the images displayed by the liquid crystal display device 202 in the touch panel-equipped mirror display 201c, the present inventors observed a rainbow effect in the displayed images. Here, "rainbow effect" refers to a phenomenon present in transmissive displays that utilize two polarizing elements, where rainbow-like color irregularities (coloring due to birefringence) occur due to the effects of the phase differences created by any members that are arranged between the two polarizing elements. Upon investigating the cause of this rainbow effect in the displayed images, the present inventors discovered that the touch panel 204 that was arranged between the absorptive polarizer 208b and the reflective polarizer 211 in the liquid crystal display device 202 was creating a phase difference that caused this rainbow effect. Therefore, in touch panel-equipped mirror displays that include a mirror display in combination with a touch panel, there is still room for improvement in terms of reducing distortion and ghosting in mirror images while also reducing the rainbow effect in displayed images.

The present invention was made in light of the foregoing and aims to provide a touch panel-equipped mirror display that makes it possible to reduce distortion and ghosting in mirror images while also reducing the rainbow effect in displayed images.

Means for Solving the Problems

As described above, upon studying various types of touch panel-equipped mirror displays, the present inventors discovered that arranging a mirror plate in which a reflective polarizer and a substrate are fixed together on the viewing side of a touch panel makes it possible to reduce distortion and ghosting in mirror images. However, as also described above, in this type of configuration, if a touch panel that creates a phase difference in light is arranged between the polarizer on the viewing side of the display device and the reflective polarizer, the rainbow effect will occur in displayed images.

The present inventors therefore proceeded to study various touch panel-equipped mirror displays that reduced distortion and ghosting in mirror images and also exhibited reduced rainbow effect in displayed images. As a result, the present inventors discovered that arranging a mirror plate in which a reflective polarizer and a substrate are fixed together on the viewing side of a touch panel and using a touch panel that does not create a phase difference in light makes it possible to reduce distortion and ghosting in mirror images as well as reduce the rainbow effect in displayed images. The inventors predicted that this could effectively solve the abovementioned problems and thereby arrived at the present invention.

In other words, one aspect of the present invention may be a touch panel-equipped mirror display, including, in order from a rear side: a display device including a polarizer; a touch panel; and a mirror plate including a reflective polarizer and a substrate, wherein the reflective polarizer and the substrate are fixed together, and wherein a phrase difference created by the touch panel for light at a wavelength of 550 nm is less than or equal to 20 nm does not create a phase difference in light.

Effects of the Invention

The present invention makes it possible to provide a touch panel-equipped mirror display that can reduce distortion and ghosting in mirror images while also reducing the rainbow effect in displayed images.

DETAILED DESCRIPTION OF EMBODIMENTS

Embodiments (and working examples) of the present invention will be explained in detail below with reference to figures. However, the present invention is not limited only to these embodiments (and working examples). Moreover, aspects of the configuration of each embodiment (and each working example) may be combined or modified as appropriate within the spirit of the present invention.

The following embodiments (and working examples) are described as configurations in which a liquid crystal display device is used as the display device; however, the type of display device is not particularly limited, and any display device that emits polarized light may be used.

Embodiment 1

Embodiment 1 relates to a touch panel-equipped mirror display that includes a liquid crystal display device, a touch panel, and a mirror plate.

Figure 1:
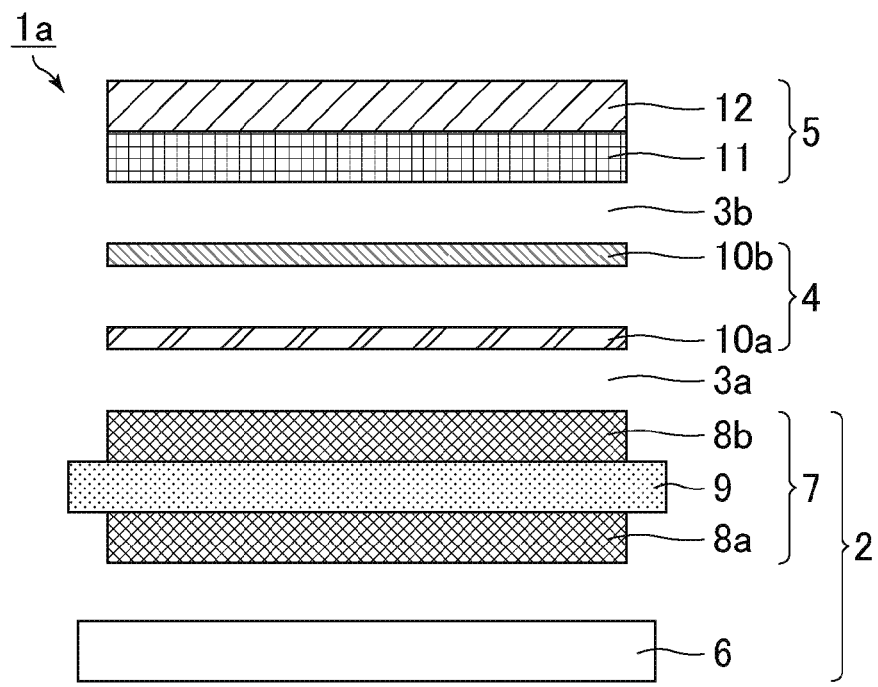
FIG. 1 is a cross-sectional view schematically illustrating a touch panel-equipped mirror display according to Embodiment 1.

FIG. 1 is a cross-sectional view schematically illustrating the touch panel-equipped mirror display according to Embodiment 1. As illustrated in FIG. 1, a touch panel-equipped mirror display 1a includes a liquid crystal display device 2, an air gap 3a, a touch panel 4, an air gap 3b, and a mirror plate 5 that are arranged in that order from the rear side to the viewing side. The air gap 3a is a space formed by a small gap between the liquid crystal display device 2 and the touch panel 4. The liquid crystal display device 2 and the touch panel 4 are layered and fixed together separated from one another by the air gap 3a, with the peripheral portions of the liquid crystal display device 2 and the touch panel 4 being fixed to one another by an adhesive layer (not illustrated in the figure). The air gap 3b is a space formed by a small gap between the touch panel 4 and the mirror plate 5. The touch panel 4 and the mirror plate 5 are layered and fixed together separated from one another by the air gap 3b, with the peripheral portions of the touch panel 4 and the mirror plate 5 being fixed to one another by an adhesive layer (not illustrated in the figure). The air gap 3a and 3b may alternatively be vacuum gaps. In the present specification, the "viewing side" refers to the upper side of the touch panel-equipped mirror display 1a as illustrated in FIG. 1. Meanwhile, the "rear side" refers to the bottom side of the touch panel-equipped mirror display 1a as illustrated in FIG. 1. These same terminology conventions will be used in the other embodiments as well.

The liquid crystal display device 2 includes a backlight 6 and a liquid crystal panel 7 that are arranged in that order from the rear side to the viewing side. The liquid crystal panel 7 includes an absorptive polarizer 8a, a liquid crystal cell 9, and an absorptive polarizer 8b that are arranged in that order from the rear side to the viewing side. The absorptive polarizer 8a is fixed to the rear side of the liquid crystal cell 9 by an adhesive layer (not illustrated in the figure). The absorptive polarizer 8b is fixed to the viewing side of the liquid crystal cell 9 by an adhesive layer (not illustrated in the figure). The liquid crystal cell 9 includes a liquid crystal layer sandwiched between a pair of substrates (not illustrated in the figure). The pair of substrates of the liquid crystal cell 9 are fixed together by a sealing material (not illustrated in the figure) such that the liquid crystal layer is sandwiched therebetween.

The technology used for the backlight 6 is not particularly limited, and examples of technologies that can be used include edge-lit technologies, direct-lit technologies, and the like. Similarly, the type of display light source used in the backlight 6 is not particularly limited, and examples of light sources that can be used include light-emitting diodes (LEDs), cold cathode fluorescent lamps (CCFLs), and the like.

The display mode of the liquid crystal panel 7 is not particularly limited, and examples of display modes that can be used include twisted nematic (TN) modes, vertical Alignment (VA) modes, in-plane switching (IPS) modes, fringe field switching (FFS) modes, and the like. When the touch panel-equipped mirror display 1a is used as a mirror, it is preferable that the display screen of the liquid crystal display device 2 be set to a black display state. Moreover, from the perspective of reducing power consumption, it is also preferable that no voltage be applied to the liquid crystal display device 2 during this time. Given these considerations, it is therefore preferable that a normally black display mode in which the black display state is achieved when no voltage is applied (such as a VA mode, an IPS mode, or an FFS mode, for example) be used as the display mode for the liquid crystal panel 7. The driving method used in the liquid crystal panel 7 is not particularly limited, and examples of schemes that can be used include active-matrix driving methods, static driving methods, simple-matrix driving methods, and the like.

The relationship between the transmission axes of the absorptive polarizers 8a and 8b may be set as appropriate according to the display mode of the liquid crystal panel 7. From the perspective of achieving good visibility of both displayed images and mirror images, it is preferable that the transmission axis of the absorptive polarizer 8b that is on the side near the mirror plate 5 be parallel to the transmission axis of a reflective polarizer 11.

The types of substrates used for the pair of substrates in the liquid crystal cell 9 are not particularly limited, and examples of pairs of substrates that can be used include combinations of a thin-film transistor array substrate and a color filter substrate, or the like.

The thin-film transistor array substrate may have a configuration in which the various types of wires for thin-film transistor elements or the like are formed on a glass substrate or a configuration in which some other type of transparent substrate such as a plastic substrate is used instead of a glass substrate, for example. The material used for the semiconductor layers of the thin-film transistor elements is not particularly limited, and examples of materials that may be used include amorphous silicon, low-temperature polysilicon, oxide semiconductors, and the like. Examples of oxide semiconductors that can be used include compounds made of indium, gallium, zinc, and oxygen; compounds made of indium, zinc, and oxygen; and the like. Compounds made of indium, gallium, zinc, and oxygen exhibit low off-leakage currents, and therefore using such a compound for the oxide semiconductor makes it possible to implement an idling stop driving scheme in which once a voltage is applied to each element, those elements retain their voltage states until the next time data is written. Therefore, from the perspective of reducing power consumption, it is preferable that a compound made of indium, gallium, zinc, and oxygen be used for the oxide semiconductor.

The color filter substrate may have a configuration in which color filter layers or the like are arranged on a glass substrate or a configuration in which some other type of transparent substrate such as a plastic substrate is used instead of a glass substrate, for example. Moreover, the combination of colors used in the color filter layers is not particularly limited, and examples of combinations that can be used include combinations of red, green, and blue; combinations of red, green, blue, and yellow; and the like.

The touch panel 4 is a resistive touch panel that includes a transparent resistive member 10a and a transparent resistive member 10b arranged in that order from the rear side to the viewing side. A frame-shaped insulating layer (not illustrated in the figure) that functions as an insulating spacer is arranged between the peripheral portions of the transparent resistive members 10a and 10b, thereby insulating the transparent resistive members 10a and 10b from one another and maintaining a space therebetween. Moreover, the touch panel 4 does not create a phase difference in light. This eliminates the phase difference between the absorptive polarizer 8b arranged on the viewing side of the liquid crystal display device 2 and the reflective polarizer 11 of the mirror plate 5, thereby making it possible to reduce occurrence of the rainbow effect and to reduce any decreases in the amount of light that passes through the reflective polarizer 11 while the liquid crystal display device 2 is displaying images. In the present specification, "does not create a phase difference in light" means that in the context of reducing the rainbow effect in displayed images, a member creates substantially no phase difference in light that passes therethrough. Here, this is defined to mean at least that the phase difference for light of a wavelength of 550 nm is less than or equal to 20 nm, and more preferably that the phase difference for the entire spectrum of visible light (wavelengths of 380 nm to 780 nm) is less than or equal to 20 nm.

The transparent resistive members 10a and 10b may be made of a transparent and conductive material that itself has a prescribed resistivity or may have a configuration in which a transparent conductive film is formed on the surface of an insulating substrate. A material such as indium tin oxide (ITO) can be used as this transparent and conductive material or for this transparent conductive film, for example. The material used for the insulating substrate is not particularly limited as long as that material does not create a phase difference in light, and examples of materials that can be used include glass substrates and films that do not create a phase difference in light (hereinafter, "zero phase difference films"). The material used for such a glass substrate is not particularly limited, and examples of materials that can be used include soda-lime glass, fused quartz, alkali-free glass, borosilicate glass, and the like. From the perspective of preventing cracks, it is preferable that a tempered glass be used. When the configuration in which a transparent conductive film is formed on the surface of an insulating substrate is used for the transparent resistive members 10a and 10b, the members are arranged with the transparent conductive films thereof facing one another.

The mirror plate 5 includes the reflective polarizer 11 and a substrate 12, which are arranged in that order from the rear side to the viewing side. The reflective polarizer 11 and the substrate 12 are fixed to one another. In order to make it possible to prevent warping in the reflective polarizer 11, it is preferable that the substrate 12 be a plate-shaped member with greater rigidity than the reflective polarizer 11, and it is also preferable that at least the surface of the substrate 12 on the reflective polarizer 11 side be flat and smooth. In the present specification, "fixed to one another" is defined to include any configuration that makes it possible for the substrate 12 to prevent warping of the reflective polarizer 11. A bonding material such as an adhesive layer or a bonding layer may be formed between the reflective polarizer 11 and the substrate 12, or another separate member may be used in addition to such a bonding material. Moreover, it is preferable that at least the entire region of the reflective polarizer 11 that forms a mirror surface be bonded to the substrate 12, and it is more preferable that the entire surface of the reflective polarizer 11 be bonded to the substrate 12.

Here, a multilayer reflective polarizer, a wire grid polarizer, a reflective polarizer in which cholesteric liquid crystals are used in combination with a quarter-wave plate, or the like can be used as the reflective polarizer 11, for example. Examples of multilayer reflective polarizer that can be used include Sumitomo 3M reflective polarizers (product name: DBEF) and the like. Examples of reflective polarizers in which cholesteric liquid crystals are used in combination with a quarter-wave plate include Nitto Denko Corporation reflective polarizers (product name: NIPOCS) and the like. The reflectance (luminous reflectance) and transmittance of the reflective polarizer are not particularly limited and can be adjusted as needed by layering together two or more reflective polarizers with the transmission axes thereof being shifted relative to one another, for example.

A glass substrate, a plastic substrate made of a resin such as an acrylic or vinyl chloride resin, or the like can be used for the substrate 12, for example. From the perspective of sufficiently reducing distortion in mirror images, it is preferable that a glass substrate (that is, a substrate with greater rigidity) be used. The material used for such a glass substrate is not particularly limited, and examples of materials that can be used include soda-lime glass, fused quartz, alkali-free glass, borosilicate glass, and the like. From the perspective of preventing cracks, it is preferable that a tempered glass be used. The thickness of the substrate 12 is not particularly limited and can be set in accordance with factors such as the material used and the rigidity thereof. When the substrate 12 is a glass substrate, for example, it is preferable that the thickness of the glass substrate be greater than or equal to 0.1 mm and less than or equal to 0.4 mm. If the glass substrate is too thin, it may not be possible to sufficiently reduce distortion in the mirror images, or the glass substrate may crack when the touch panel 4 is used (touched). Meanwhile, if the glass substrate is too thick, the responsiveness of the touch panel 4 may suffer. For example, when the thickness of the glass substrate is greater than or equal to 0.5 mm, the touch panel 4 is more likely to exhibit decreased responsiveness.

In the touch panel-equipped mirror display according to Embodiment 1, the reflective polarizer 11 is fixed to the substrate 12 and is therefore less prone to warping, thereby making it possible to reduce distortion in mirror images. Moreover, the mirror plate 5 in which the reflective polarizer 11 and the substrate 12 are fixed together is arranged on the viewing side of the touch panel 4, and therefore light that enters the touch panel-equipped mirror display 1a from the viewing side is primarily reflected by the reflective polarizer 11. This makes it possible to reduce ghosting in the mirror images. Furthermore, the touch panel 4 that is arranged between the absorptive polarizer 8b of the liquid crystal display device 2 and the reflective polarizer 11 does not create any phase difference in light, thereby making it possible to reduce the rainbow effect in displayed images and to reduce any decreases in the amount of light that passes through the reflective polarizer 11 while the liquid crystal display device 2 is displaying images.

The touch panel-equipped mirror display according to Embodiment 1 utilizes a configuration in which the liquid crystal display device 2 and the touch panel 4 are separated from one another by the air gap 3a. However, a configuration in which the air gap 3a is eliminated and the liquid crystal display device 2 and the touch panel 4 are fixed together by an adhesive layer, bonding layer, or the like may also be used. Moreover, a configuration in which antireflective films are formed on the viewing side of the liquid crystal display device 2 (that is, on the absorptive polarizer 8b) and on the rear side of the touch panel 4 (that is, on the transparent resistive member 10a) may also be used. This makes it possible to reduce reflection at the interface between the liquid crystal display device 2 and the air gap 3a and at the interface between the touch panel 4 and the air gap 3a, thereby making it possible to sufficiently reduce ghosting in the mirror images.

Next, working examples of the touch panel-equipped mirror display according to Embodiment 1 will be described.

Working Example 1

In Working Example 1, a glass substrate was used as the substrate 12.

The liquid crystal display device built into the Nintendo Wii U (registered trademark) controller was used as the liquid crystal display device 2.

A transparent conductive film (ITO) formed on the surface of a glass substrate was used as the transparent resistive member 10a. A Corning Inc. glass substrate (product name: EAGLE XG (registered trademark)) with a thickness of 0.7 mm was used as the glass substrate. A transparent conductive film (ITO) formed on the surface of a zero phase difference film was used as the transparent resistive member 10b. A Fujifilm Corporation film (product name: Z-TAC) with a thickness of 80 μm was used as the zero phase difference film. Moreover, the phase difference created by this zero phase difference film in light of a wavelength of 550 nm was 0.2 nm. The phase difference created by the touch panel 4 in light of a wavelength of 550 nm was 0.3 nm.

A Sumitomo 3M reflective polarizer (product name: DBEF) was used as the reflective polarizer 11 and arranged such that the transmission axis thereof was parallel to the transmission axis of the absorptive polarizer 8b. An Apeiros Co. tempered glass screen protector (product name: Crystal Armor) with a thickness of 0.4 mm was used as the substrate 12. The reflective polarizer 11 and the substrate 12 were fixed together as a single component using an adhesive layer.

Working Example 2

In Working Example 2, the thickness of the substrate 12 was reduced relative to in Working Example 1. Except for this aspect of the configuration, the touch panel-equipped mirror display of Working Example 2 was the same as the touch panel-equipped mirror display of Working Example 1, and therefore a description of the identical aspects will be omitted here.

Here, an Apeiros Co. tempered glass screen protector (product name: Crystal Armor) with a thickness of 0.2 mm was used as the substrate 12.

Working Example 3

In Working Example 3, the thickness of the substrate 12 was reduced relative to in Working Example 1. Except for this aspect of the configuration, the touch panel-equipped mirror display of Working Example 3 was the same as the touch panel-equipped mirror display of Working Example 1, and therefore a description of the identical aspects will be omitted here.

Here, an Apeiros Co. tempered glass screen protector (product name: Crystal Armor) with a thickness of 0.33 mm was used as the substrate 12.

Working Example 4

In Working Example 4, the thickness of the substrate 12 was increased relative to in Working Example 1. Except for this aspect of the configuration, the touch panel-equipped mirror display of Working Example 4 was the same as the touch panel-equipped mirror display of Working Example 1, and therefore a description of the identical aspects will be omitted here.

Here, an Apeiros Co. tempered glass screen protector (product name: Crystal Armor) with a thickness of 0.55 mm was used as the substrate 12.

Embodiment 2

Embodiment 2 relates to a touch panel-equipped mirror display that includes a liquid crystal display device, a touch panel, and a mirror plate and differs from Embodiment 1 in that the mirror plate is fixed to the touch panel by an adhesive layer. Except for this aspect of the configuration, the touch panel-equipped mirror display according to Embodiment 2 was the same as the touch panel-equipped mirror display according to Embodiment 1, and therefore a description of the identical aspects will be omitted here.

Figure 2:
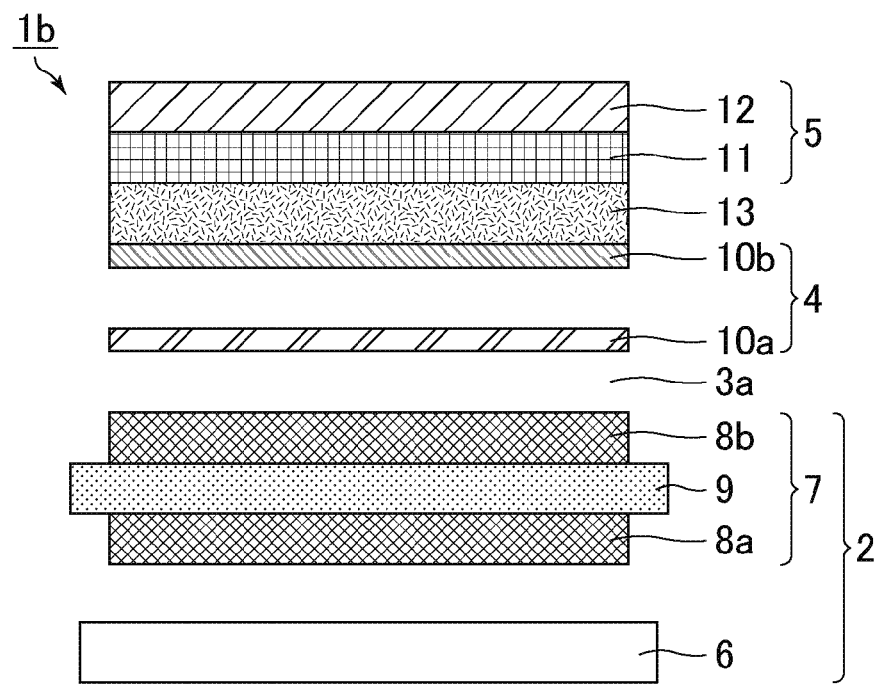
FIG. 2 is a cross-sectional view schematically illustrating a touch panel-equipped mirror display according to Embodiment 2.

FIG. 2 is a cross-sectional view schematically illustrating the touch panel-equipped mirror display according to Embodiment 2. As illustrated in FIG. 2, a touch panel-equipped mirror display 1b includes a liquid crystal display device 2, an air gap 3a, a touch panel 4, an adhesive layer 13, and a mirror plate 5 that are arranged in that order from the rear side to the viewing side. The mirror plate 5 is fixed to the viewing side of the touch panel 4 by the adhesive layer 13.

Here, it is preferable that a material that is transparent enough not to reduce the visibility of displayed images or mirror images be used for the adhesive layer 13. The material used for the adhesive layer 13 is not particularly limited, and examples of materials that can be used include acrylic adhesives and the like. The thickness of the adhesive layer 13 is not particularly limited, but it is preferable that the thickness be greater than or equal to 5 μm and less than or equal to 50 μm. If the adhesive layer 13 is too thin, the resulting adhesion may be too weak, and the reliability of the configuration may suffer. Meanwhile, if the adhesive layer 13 is too thick, the responsiveness of the touch panel 4 may suffer.

Similar to the touch panel-equipped mirror display according to Embodiment 1, the touch panel-equipped mirror display according to Embodiment 2 makes it possible to reduce distortion and ghosting in mirror images as well as to reduce the rainbow effect in displayed images. Furthermore, in the touch panel-equipped mirror display according to Embodiment 2, reflection of light by the surface of the touch panel 4 is reduced to a greater extent than in Embodiment 1 due to the adhesive layer 13 being formed between the touch panel 4 and the mirror plate 5, thereby making it possible to sufficiently reduce ghosting in the mirror images. This is because the difference between the refractive indices of the transparent resistive member 10b and the adhesive layer 13 in the touch panel-equipped mirror display according to Embodiment 2 is less than the difference between the refractive indices of the transparent resistive member 10b and the air gap 3b in the touch panel-equipped mirror display according to Embodiment 1.

The touch panel-equipped mirror display according to Embodiment 2 utilizes a configuration in which the mirror plate 5 is fixed to the viewing side of the touch panel 4 by the adhesive layer 13. However, a configuration in which the adhesive layer 13 is replaced with a bonding layer made of a photocurable resin such as a UV curable resin may also be used.

Next, a working example of the touch panel-equipped mirror display according to Embodiment 2 will be described.

Working Example 5

In Working Example 5, the mirror plate 5 was fixed to the touch panel 4 using the adhesive layer 13. Except for this aspect of the configuration, the touch panel-equipped mirror display of Working Example 5 was the same as the touch panel-equipped mirror display of Working Example 1, and therefore a description of the identical aspects will be omitted here.

A PANAC Co. adhesive (product name: PD-S1) formed to a thickness of 25 μm was used as the adhesive layer 13.

The touch panel-equipped mirror displays of Working Examples 1 to 5 utilize a configuration in which a transparent conductive film (ITO) formed on the surface of a glass substrate is used for the transparent resistive member 10a and a transparent conductive film (ITO) formed on the surface of a zero phase difference film is used for the transparent resistive member 10b. However, configurations such as (A) to (C) below may also be used, for example.
(A) Configuration in which a transparent conductive film formed on the surface of a zero phase difference film is used for the transparent resistive member 10a and a transparent conductive film formed on the surface of a glass substrate is used for the transparent resistive member 10b.
(B) Configuration in which a transparent conductive film formed on the surface of a zero phase difference film is used for both the transparent resistive members 10a and 10b.
(C) Configuration in which a transparent conductive film formed on the surface of a glass substrate is used for both the transparent resistive members 10a and 10b.

Comparison Example 1

Comparison Example 1 relates to a touch panel-equipped mirror display that includes a liquid crystal display device, a touch panel, and a mirror plate and differs from Embodiment 1 in terms of the phase difference created by the touch panel.

Figure 3:
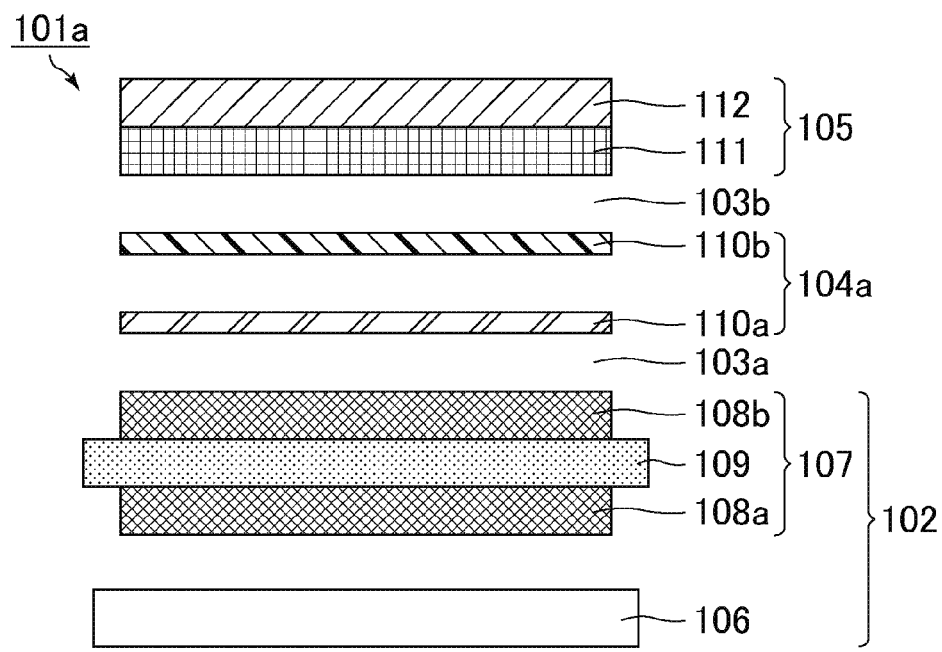
FIG. 3 is a cross-sectional view schematically illustrating a touch panel-equipped mirror display according to Comparison Example 1.

FIG. 3 is a cross-sectional view schematically illustrating the touch panel-equipped mirror display according to Comparison Example 1. As illustrated in FIG. 3, a touch panel-equipped mirror display 101a includes a liquid crystal display device 102, an air gap 103a, a touch panel 104a, an air gap 103b, and a mirror plate 105 that are arranged in that order from the rear side to the viewing side. The air gap 103a is a space formed by a small gap between the liquid crystal display device 102 and the touch panel 104a. The liquid crystal display device 102 and the touch panel 104a are layered and fixed together separated from one another by the air gap 103a, with the peripheral portions of the liquid crystal display device 102 and the touch panel 104a being fixed to one another by an adhesive layer (not illustrated in the figure). The air gap 103b is a space formed by a small gap between the touch panel 104a and the mirror plate 105. The touch panel 104a and the mirror plate 105 are layered and fixed together separated from one another by the air gap 103b, with the peripheral portions of the touch panel 104a and the mirror plate 105 being fixed to one another by an adhesive layer (not illustrated in the figure).

The liquid crystal display device 102 includes a backlight 106 and a liquid crystal panel 107 that are arranged in that order from the rear side to the viewing side. The liquid crystal panel 107 includes an absorptive polarizer 108a, a liquid crystal cell 109, and an absorptive polarizer 108b that are arranged in that order from the rear side to the viewing side. The absorptive polarizer 108a is fixed to the rear side of the liquid crystal cell 109 by an adhesive layer (not illustrated in the figure). The absorptive polarizer 108b is fixed to the viewing side of the liquid crystal cell 109 by an adhesive layer (not illustrated in the figure). The liquid crystal cell 109 includes a liquid crystal layer sandwiched between a pair of substrates (not illustrated in the figure). The pair of substrates of the liquid crystal cell 109 are fixed together by a sealing material (not illustrated in the figure) such that the liquid crystal layer is sandwiched therebetween. Here, the liquid crystal display device built into the Nintendo Wii U controller was used as the liquid crystal display device 102.

The touch panel 104a is a resistive touch panel that includes a transparent resistive member 110a and a transparent resistive member 110b arranged in that order from the rear side to the viewing side. The touch panel built into the Nintendo Wii U was used as the touch panel 104a. A transparent conductive film (ITO) formed on the surface of a glass substrate was used for the transparent resistive member 110a, and a transparent conductive film (ITO) formed on the surface of a polyethylene terephthalate (PET) film was used for the transparent resistive member 110b.

The mirror plate 105 includes a reflective polarizer 111 and a substrate 112 that are arranged in that order from the rear side to the viewing side. A Sumitomo 3M reflective polarizer (product name: DBEF) was used as the reflective polarizer 111 and arranged such that the transmission axis thereof was parallel to the transmission axis of the absorptive polarizer 108b. An Apeiros Co. tempered glass screen protector (product name: Crystal Armor) with a thickness of 0.4 mm was used as the substrate 112. The reflective polarizer 111 and the substrate 112 were fixed together as a single component using an adhesive layer.

In the touch panel-equipped mirror display according to Comparison Example 1, the reflective polarizer 111 is fixed to the substrate 112 and is therefore less prone to warping, thereby making it possible to reduce distortion in mirror images. Moreover, the mirror plate 105 in which the reflective polarizer 111 and the substrate 112 are fixed together is arranged on the viewing side of the touch panel 104a, and therefore light that enters the touch panel-equipped mirror display 101a from the viewing side is primarily reflected by the reflective polarizer 111. This makes it possible to reduce ghosting in the mirror images. However, the touch panel 104a that is arranged between the absorptive polarizer 108b of the liquid crystal display device 102 and the reflective polarizer 111 creates a phase difference in light (due to the phase difference created by the PET film used for the transparent resistive member 110b), and therefore Comparison Example 1 does not make it possible to reduce the rainbow effect in displayed images.

Comparison Example 2

In Comparison Example 2, the reflective polarizer was fixed to the viewing side of the touch panel instead of using a mirror plate.

Figure 4:
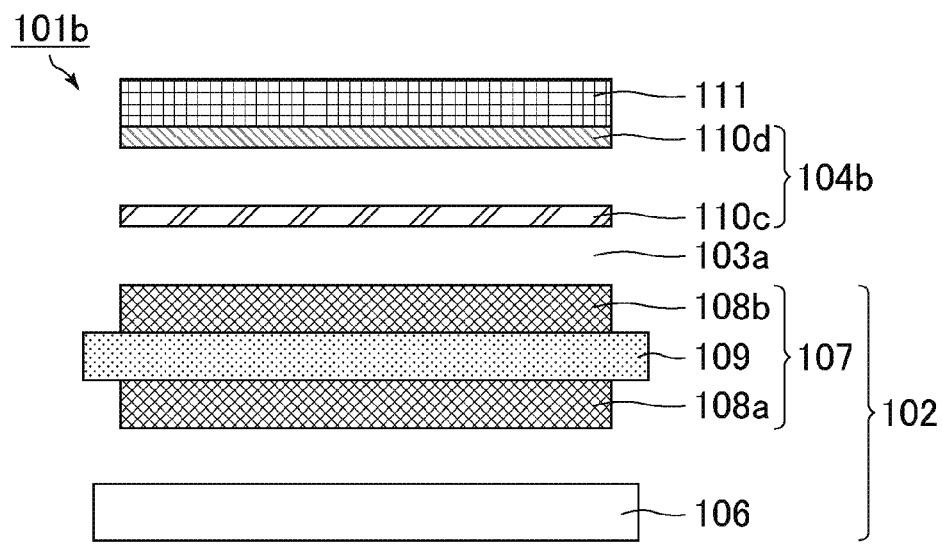
FIG. 4 is a cross-sectional view schematically illustrating a touch panel-equipped mirror display according to Comparison Example 2.

FIG. 4 is a cross-sectional view schematically illustrating the touch panel-equipped mirror display according to Comparison Example 2. As illustrated in FIG. 4, a touch panel-equipped mirror display 101b includes a liquid crystal display device 102, an air gap 103a, a touch panel 104b, and a reflective polarizer 111 that are arranged in that order from the rear side to the viewing side. The air gap 103a is a space formed by a small gap between the liquid crystal display device 102 and the touch panel 104b. The liquid crystal display device 102 and the touch panel 104b are layered and fixed together separated from one another by the air gap 103a, with the peripheral portions of the liquid crystal display device 102 and the touch panel 104b being fixed to one another by an adhesive layer (not illustrated in the figure). The same components as in Comparison Example 1 were used for the liquid crystal display device 102 and the reflective polarizer 111.

The touch panel 104b is a resistive touch panel that includes a transparent resistive member 110c and a transparent resistive member 110d arranged in that order from the rear side to the viewing side. A frame-shaped insulating layer (not illustrated in the figure) that functions as an insulating spacer is arranged between the peripheral portions of the transparent resistive members 110c and 110d, thereby insulating the transparent resistive members 110c and 110d from one another and maintaining a space therebetween. The reflective polarizer 111 is fixed to the transparent resistive member 110d on the side opposite to the transparent resistive member 110c. A transparent conductive film (ITO) formed on the surface of a glass substrate was used as the transparent resistive member 110c. A Corning Inc. glass substrate (product name: EAGLE XG) with a thickness of 0.7 mm was used as the glass substrate. A transparent conductive film (ITO) formed on the surface of a zero phase difference film was used as the transparent resistive member 110d. A Fujifilm Corporation film (product name: Z-TAC) with a thickness of 80 μm was used as the zero phase difference film. Moreover, the phase difference created by this zero phase difference film in light of a wavelength of 550 nm was 0.2 nm. The phase difference created by the touch panel 104b in light of a wavelength of 550 nm was 0.3 nm.

In the touch panel-equipped mirror display according to Comparison Example 2, the reflective polarizer 111 is fixed to the viewing side of the touch panel 104b, and therefore light that enters the touch panel-equipped mirror display 101b from the viewing side is primarily reflected by the reflective polarizer 111. This makes it possible to reduce ghosting in the mirror images. Furthermore, the touch panel 104b that is arranged between the absorptive polarizer 108b of the liquid crystal display device 102 and the reflective polarizer 111 does not create any phase difference in light, thereby making it possible to reduce the rainbow effect in displayed images. However, because the transparent resistive member 110d to which the reflective polarizer 111 is fixed is made of a film that is prone to warping, the reflective polarizer 111 directly inherits any warping present in the transparent resistive member 110d. As a result, Comparison Example 2 does not make it possible to reduce distortion in the mirror images.

Comparison Example 3

In Comparison Example 3, instead of fixing the reflective polarizer 111 to the viewing side of the touch panel 104b as in Comparison Example 2, the reflective polarizer 111 was fixed to the rear side of the touch panel 104b. Except for this aspect of the configuration, the touch panel-equipped mirror display of Comparison Example 3 was the same as the touch panel-equipped mirror display of Comparison Example 2, and therefore a description of the identical aspects will be omitted here.

Figure 5:
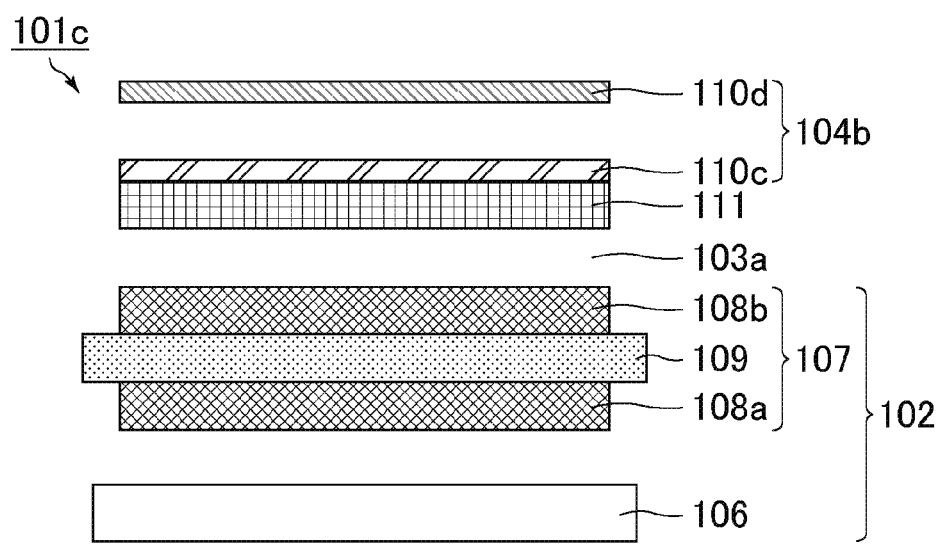
FIG. 5 is a cross-sectional view schematically illustrating a touch panel-equipped mirror display according to Comparison Example 3.
Figure 6:
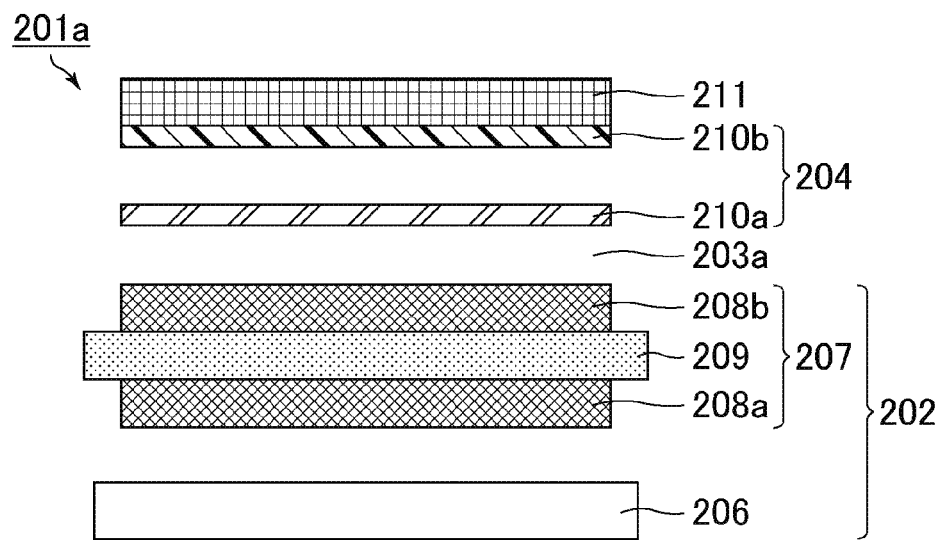
FIG. 6 is a cross-sectional view schematically illustrating a first touch panel-equipped mirror display that was studied by the present inventors.
Figure 7:
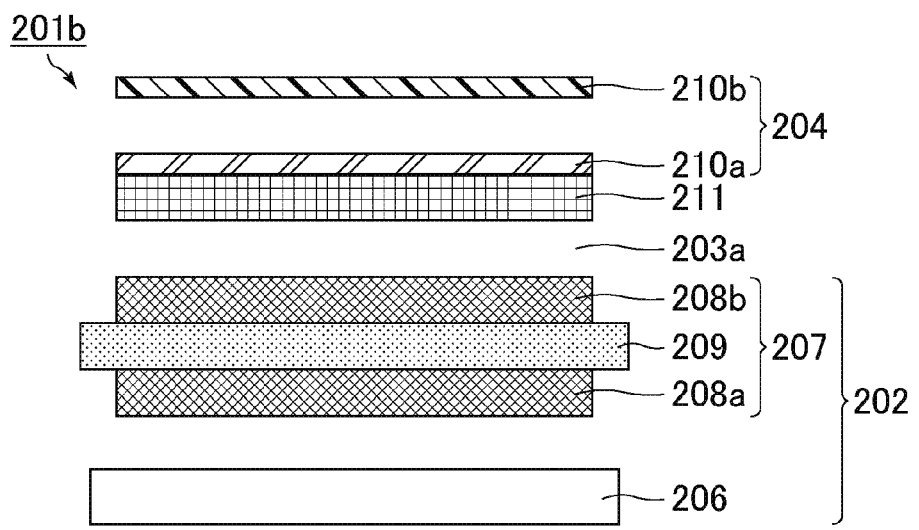
FIG. 7 is a cross-sectional view schematically illustrating a second touch panel-equipped mirror display that was studied by the present inventors.
Figure 8:
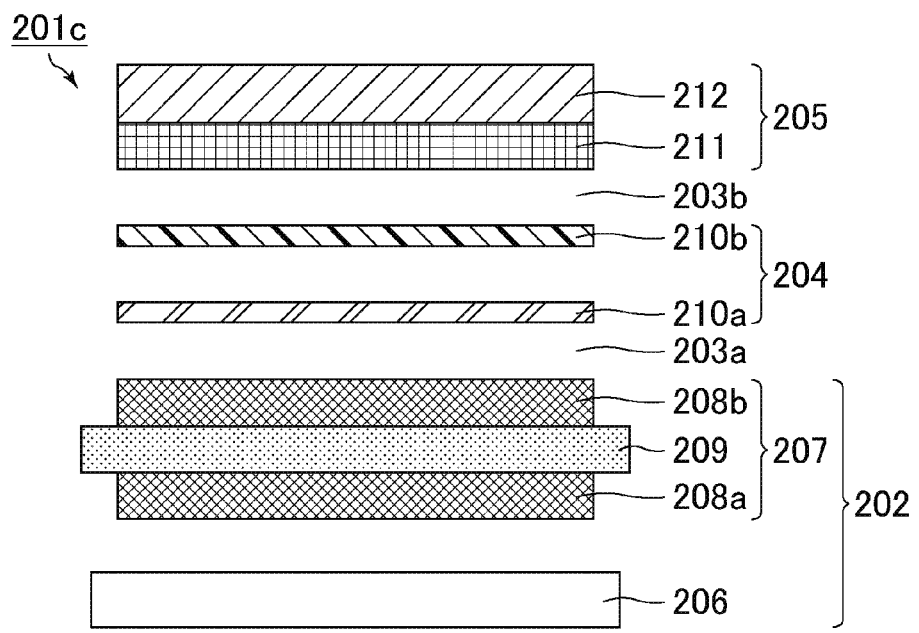
FIG. 8 is a cross-sectional view schematically illustrating a third touch panel-equipped mirror display that was studied by the present inventors.

FIG. 5 is a cross-sectional view schematically illustrating the touch panel-equipped mirror display according to Comparison Example 3. As illustrated in FIG. 5, a touch panel-equipped mirror display 101c includes a liquid crystal display device 102, an air gap 103a, the reflective polarizer 111, and the touch panel 104b, which are arranged in that order from the rear side to the viewing side. The air gap 103a is a space formed by a small gap between the liquid crystal display device 102 and the reflective polarizer 111. The liquid crystal display device 102 and the reflective polarizer 111 are layered and fixed together separated from one another by the air gap 103a, with the peripheral portions of the liquid crystal display device 102 and the reflective polarizer 111 being fixed to one another by an adhesive layer (not illustrated in the figure). The reflective polarizer 111 is fixed to the transparent resistive member 110c on the side opposite to the transparent resistive member 110d.

In the touch panel-equipped mirror display according to Comparison Example 3, the reflective polarizer 111 is fixed to the transparent resistive member 110c that includes a glass substrate and is therefore less prone to warping, thereby making it possible to reduce distortion in mirror images. Furthermore, no member that could potentially create a phase difference in light is arranged between the absorptive polarizer 108b of the liquid crystal display device 102 and the reflective polarizer 111, thereby making it possible to reduce the rainbow effect in displayed images. However, light that enters the touch panel-equipped mirror display 101c from the viewing side is primarily reflected by both the transparent resistive member 110d and the reflective polarizer 111, and both reflected images are visible. Therefore, Comparison Example 3 does not make it possible to reduce ghosting in the mirror images.

<Results of Touch Panel-Equipped Mirror Display Evaluation>

Table 1 summarizes the results of evaluating distortion in mirror images, ghosting in mirror images, and the rainbow effect in displayed images in the touch panel-equipped mirror displays in Working Examples 1 to 5 and Comparison Examples 1 to 3.

To evaluate the distortion in mirror images, five viewers observed the mirror images produced by each of the touch panel-equipped mirror displays when illuminated with fluorescent light and evaluated the visibility of distortion in those mirror images. The following evaluation categories were used: None—No distortion visible, completely satisfied; Slight—Distortion slightly visible, but still acceptable; Severe—Distortion clearly visible, not acceptable. Here, the effects of the present invention were determined as having been successfully achieved when the evaluation results were "None" or "Slight."

To evaluate ghosting in mirror images, five viewers observed the mirror images produced by each of the touch panel-equipped mirror displays when illuminated with fluorescent light and evaluated the visibility of ghosting in those mirror images. The following evaluation categories were used: None—No ghosting visible, completely satisfied; Slight—Ghosting slightly visible, but still acceptable; Severe—Ghosting clearly visible, not acceptable. Here, the effects of the present invention were determined as having been successfully achieved when the evaluation results were "None" or "Slight."

To evaluate the rainbow effect in displayed images, five viewers observed images displayed on the liquid crystal display devices and evaluated the visibility of the rainbow effect in those displayed images. The following evaluation categories were used: None—No rainbow effect visible, completely satisfied; Slight—Rainbow effect slightly visible, but still acceptable; Severe—Rainbow effect clearly visible, not acceptable. Here, the effects of the present invention were determined as having been successfully achieved when the evaluation results were "None" or "Slight."

TABLE 1

|  | Distortion in Mirror Images | Ghosting in Mirror Images | Rainbow Effect in Displayed Images |
|---|---|---|---|
| Working Example 1 | None | Slight | None |
| Working Example 2 | None | Slight | None |
| Working Example 3 | None | Slight | None |
| Working Example 4 | None | Slight | None |
| Working Example 5 | None | None | None |
| Comparison Example 1 | None | Slight | Severe |
| Comparison Example 2 | Severe | Slight | None |
| Comparison Example 3 | None | Severe | None |

As shown in Table 1, the touch panel-equipped mirror displays of Working Examples 1 to 5 were all evaluated as having reduced distortion and ghosting in mirror images as well as having reduced occurrence of the rainbow effect in displayed images. The touch panel-equipped mirror display of Working Example 5 in particular was evaluated as having extremely high quality, with no visible distortion or ghosting in mirror images and no visible rainbow effect in displayed images. The slight visibility of the ghosting effect in mirror images in the touch panel-equipped mirror displays of Working Examples 1 to 4 was due to the fact that because only an air gap was present between the touch panels and mirror plates, the reflection of light at the interface between the touch panel and the air gap was slightly visible. Moreover, the touch panel-equipped mirror displays of Working Examples 1 to 3 and 5 were evaluated as having more responsive touch panels than the touch panel-equipped mirror display of Working Example 4. This was because the thicknesses of the substrates in the mirror plates of the touch panel-equipped mirror displays of Working Examples 1 to 3 and 5 were less than the thickness of the substrate in the mirror plate of the touch panel-equipped mirror displays of Working Example 4.

Meanwhile, in the touch panel-equipped mirror display of Comparison Example 1, the visibility of the rainbow effect in displayed images was evaluated as being extremely severe in comparison to in the touch panel-equipped mirror displays of the working examples. In the touch panel-equipped mirror display of Comparison Example 2, the visibility of distortion in mirror images was evaluated as being extremely severe in comparison to in the touch panel-equipped mirror displays of the working examples. In the touch panel-equipped mirror display of Comparison Example 3, the visibility of ghosting in mirror images was evaluated as being extremely severe in comparison to in the touch panel-equipped mirror displays of the working examples.

<Additional Notes>

Next, examples of preferred aspects of the touch panel-equipped mirror display according to the present invention will be described. These examples may also be combined as appropriate within the spirit of the present invention.

The substrate may be a glass substrate with a thickness of greater than or equal to 0.1 mm and less than or equal to 0.4 mm. This makes it possible to suitably apply the present invention even when a glass substrate is used as the substrate. Moreover, setting the thickness of the glass substrate to greater than or equal to 0.1 mm and less than or equal to 0.4 mm makes it possible to sufficiently reduce distortion in mirror images while maintaining good responsiveness in the touch panel.

The mirror plate may be fixed to the touch panel by an adhesive layer. This reduces reflection of light by the surface of the touch panel, thereby making it possible to sufficiently reduce ghosting in mirror images.

The display device may be a liquid crystal display device. This makes it possible to suitably apply the present invention even when a liquid crystal display device is used as the display device. Furthermore, using such a liquid crystal display device in combination with the reflective polarizer makes it possible to achieve good visibility of both displayed images and mirror images. The type of display device is not particularly limited as long as the selected display device emits polarized light. For example, rather than a liquid crystal display device, an organic electroluminescent display device onto which an antireflective polarizer is layered may be used. Moreover, a so-called 3D display that makes it possible to view stereoscopic (3D) images may also be used. 3D displays make it possible to provide a natural feeling of depth similar to that present in the mirror region in the display region as well and also improve the design aesthetics of the overall mirror display and make it possible to utilize the mirror display in a wide variety of applications. The technology used to display stereoscopic images in such a 3D display is not particularly limited, and any technology may be used. However, it is more preferable that a glasses-free technology that does not require special glasses to be worn be used. Examples of glasses-free 3D display technologies include lenticular lens technologies, parallax barrier technologies, and the like.

DESCRIPTION OF REFERENCE CHARACTERS 1a, 1b, 101a, 101b, 101c, 201a, 201b, 201c touch panel-equipped mirror display
2, 102, 202 liquid crystal display device
3a, 3b, 103a, 103b, 203a, 203b air gap
4, 104a, 104b, 204 touch panel
5, 105, 205 mirror plate
6, 106, 206 backlight
7, 107, 207 liquid crystal panel
8a, 8b, 108a, 108b, 208a, 208b absorptive polarizer
9, 109, 209 liquid crystal cell
10a, 10b, 110a, 110b, 110c, 110d, 210a, 210b transparent resistive member
11, 111, 211 reflective polarizer
12, 112, 212 substrate
13 adhesive layer

What is claimed is:
1. A touch panel-equipped mirror display, comprising, in order from a rear side:
a display device including a pair of absorptive polarizers sandwiching a cell;
a touch panel; and
a mirror plate including a reflective polarizer and a substrate,
wherein the touch panel is disposed between the display device and the mirror plate,
wherein the reflective polarizer and the substrate are fixed together,
wherein a transmission axis of the absorptive polarizer of the display device that is nearer to the mirror plate is parallel to a transmission axis of the reflective polarizer of the mirror plate, and wherein a phrase difference created by the touch panel for light at a wavelength of 550 nm is less than or equal to 20 nm.

2. The touch panel-equipped mirror display according to claim 1, wherein the substrate is a glass substrate with a thickness of 0.1 mm to 0.4 mm.

3. The touch panel-equipped mirror display according to claim 1, wherein the mirror plate is fixed to the touch panel by an adhesive layer.

4. The touch panel-equipped mirror display according to claim 1, wherein the display device is a liquid crystal display device.

5. The touch panel-equipped mirror display according to claim 1, wherein the phrase difference created by the touch panel for light in a wavelength range of 380 nm to 780 nm is less than or equal to 20 nm.

6. The touch panel-equipped mirror display according to claim 1,
wherein the touch panel includes a first resistive member and a second resistive member coupled to the first resistive member,
wherein the first resistive member includes a glass substrate and a transparent conductive film formed on the glass substrate, and the second resistive member includes a zero phase difference film and a transparent conductive film formed on the zero phase difference film, and wherein the phase difference created by the touch panel for light of a wavelength of 550 nm is 0.3 nm.

* * * * *